L. A. FAUST.
INJECTOR VALVE.
APPLICATION FILED DEC. 17, 1920.
1,420,419.
Patented June 20, 1922.
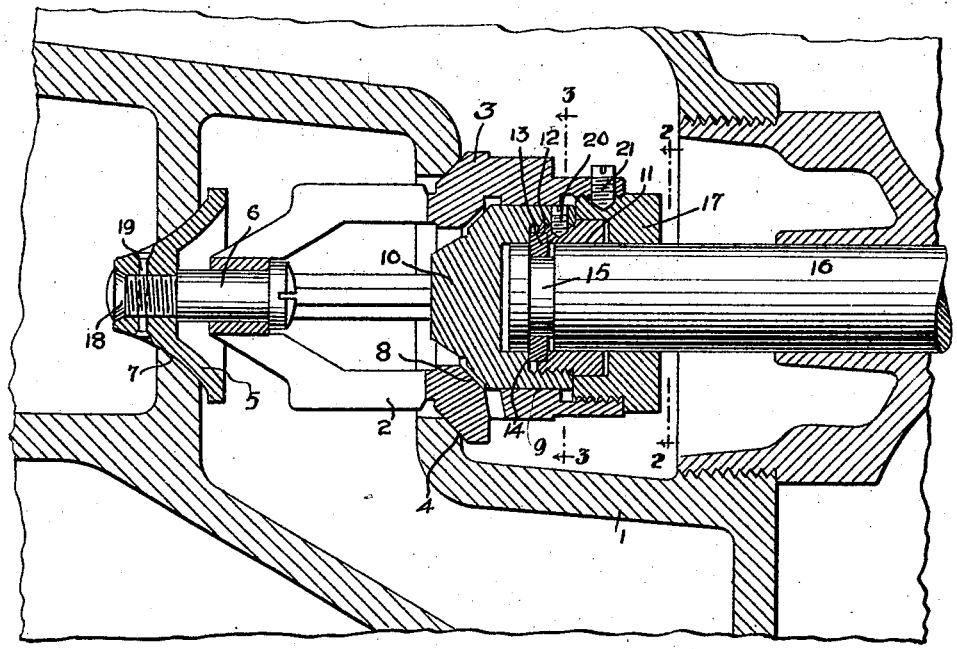
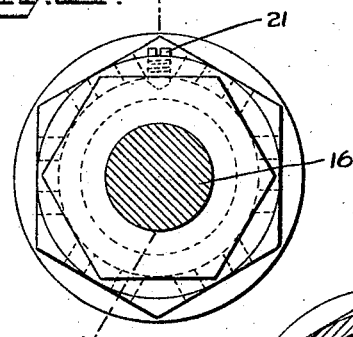
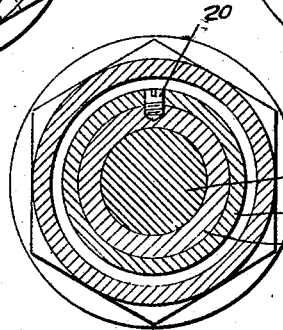
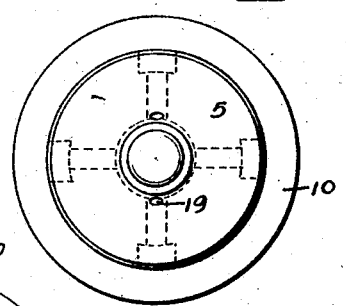
WITNESSES
H. T. Walker
A. L. Kitchin
INVENTOR
Lewis A. Faust.
BY Munn & Co
ATTORNEYS

UNITED STATES PATENT OFFICE.

LEWIS A. FAUST, OF ROSELLE PARK, NEW JERSEY.

INJECTOR VALVE.

1,420,419.   Specification of Letters Patent.   Patented June 20, 1922.

Application filed December 17, 1920. Serial No. 431,417.

*To all whom it may concern:*

Be it known that I, LEWIS A. FAUST, a citizen of the United States, and a resident of Roselle Park, in the county of Union and State of New Jersey, have invented a new and Improved Injector Valve, of which the following is a full, clear, and exact description.

This invention relates to injector valves for boilers and particularly to an improved locking means for holding certain of the valve members against coming loose. The object of the invention is to provide a series of locking means in connection with an injector valve structure whereby the valve structure must continually act in its proper capacity.

Another object is to provide an improved construction which will prevent loosening of any of the parts of the valve or any loss thereof on account of the usual jars to which the valve is subjected.

In the accompanying drawings—

Figure 1 is a sectional view through an injector valve disclosing an embodiment of the invention.

Figure 2 is a fragmentary sectional view through Figure 1 on line 2—2.

Figure 3 is a fragmentary sectional view through Figure 1 on line 3—3.

Figure 4 is an end view of the valve mechanism shown in Figure 1 looking at the same from the inner end.

Referring to the accompanying drawings by numeral, 1 indicates the casing of a well known injector valve and 2 the valve member. This valve member is now in use and is formed with a valve stopper 3 engaging the seat 4 as well as with a removable valve stopper 5 mounted on the sliding pin 6. The valve stopper 5 engages the seat 7 when in one position and moves an appreciable distance therefrom when in an open position. The valve member 2 is provided with a valve seat 8 in the end of the bore 9 which valve seat co-acts with the valve stopper 10. The valve stopper 10 is internally threaded part of its distance receiving the sleeve 11 which sleeve is provided with a notch or annular recess 12 designed to fit over part of the washer 13 which washer is pressed against the shoulder 14 when the parts are in proper operative position. It will be noted that the washer 13 extends into the groove 15 and the operating rod 16. In order to hold the sleeve in the position shown in Figure 1 a locking nut 17 is provided which is threaded into the outer end of the bore 9. It will be noted that the groove 15 is slightly wider than the washer 13 whereby the rod 16 is allowed a slight free motion independent of the valve stopper 10. The parts just described will not operate for any length of time in a proper manner by reason of the fact that the sleeve 11 backs off of the stopper 10 and the valve stopper 5 gradually wears away the upset or rigid end 18 of member 6 and is thereby disengaged from the other part of the valve structure.

To obviate the continual trouble caused by these parts getting loose which is produced by the vibration to which they are subjected a plurality of locking members are provided. In order to positively prevent the stopper 5 from getting loose a pin 19 is provided, said pin extending through part of the stopper 5 and through the pin 6. Preferably the ends of the pin 19 are upset or riveted whereby the pin forms a positive lock for the stopper 5 in respect to the member 6. In order to lock the sleeve 11 a form of set screw 20 is provided which is arranged so that its outer end will be flush with or beneath the surface of the stopper 10 while the inner end preferably fits into a recess although if desired, it could be merely pressed against the threads of the sleeve 11. The same general structure is provided for locking the nut 17, namely, the locking of set screw 21. The set screw 21 is merely held in place by friction while the set screw 20 is held in place by friction and also by the fact that the head or outer end of the screw is prevented any outward movement by reason of the walls of the bore 9. Usually the threads of screws 20 and 21 are comparatively small and these screws are preferably caused to fit tightly in place whereby they may positively lock respectively the sleeve 11 and the nut 17 while pin 19 locks the stopper 5 from disengagement.

It has been found by actual experience on some of the railroads that the parts jar loose a number of times each year and must be replaced usually by a new valve member. As this involves considerable expense and necessitates the engine being laid up, this weakness in the valve as heretofore used is a great disadvantage. In fact, it is of such great disadvantage that certain of the railroads are gradually changing to another form of valve which otherwise is not as efficient. By adding the various lock-means described the valve operates perfectly and does not get out of order by reason of any parts coming loose. The use of set screws and other devices for locking certain parts together is known but the particular arrangement of the fastening means as shown in Figure 1 has never been used heretofore.

What I claim is:

1. An injector valve provided with a plurality of valve stoppers and locking means arranged to co-act with each of the stoppers for locking the same against coming loose.

2. An injector valve provided with a main body having a valve seat and a pair of moving stoppers one within the other, an actuating rod, a washer arranged on said rod, a sleeve on said rod above said washer threaded to the inner stopper and locking between the two said washers, a second sleeve on said rod above the first mentioned sleeve threaded to the outer stopper, and locking members clamping said stoppers to their respective sleeves without interfering with their operation.

3. The combination with an injector valve provided with a pair of independently movable stoppers, of a set screw for locking one of said stoppers against coming loose and a pin having riveted or upset ends for locking the other of said stoppers against coming loose.

4. The combination with an injector valve provided with a pair of independent valve stoppers and a locking nut, a sleeve threaded to receive said locking nut, of a set screw for locking the locking nut to said sleeve against removal, a second set screw for locking one of said stoppers against coming loose, said second set screw operating within the bore provided for the last mentioned stopper and a locking pin extending through the other stopper for locking the same against disengagement.

LEWIS A. FAUST.